United States Patent
Shirasuna (10) Patent No.: US 9,417,436 B2
(45) Date of Patent: Aug. 16, 2016

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Takashi Shirasuna, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/492,190

(22) Filed: Sep. 22, 2014

(65) Prior Publication Data

US 2015/0098138 A1  Apr. 9, 2015

(30) Foreign Application Priority Data

Oct. 3, 2013 (JP) .................................. 2013-208127

(51) Int. Cl.

| | |
|---|---|
| *G02B 13/18* | (2006.01) |
| *G02B 3/02* | (2006.01) |
| *G02B 13/04* | (2006.01) |
| *G02B 9/06* | (2006.01) |
| *G02B 9/64* | (2006.01) |
| G02B 13/00 | (2006.01) |
| G02B 5/00 | (2006.01) |
| G02B 27/00 | (2006.01) |
| G02B 9/04 | (2006.01) |

(52) U.S. Cl.
CPC *G02B 13/04* (2013.01); *G02B 9/64* (2013.01); *G02B 5/005* (2013.01); *G02B 9/04* (2013.01); *G02B 13/001* (2013.01); *G02B 13/006* (2013.01); *G02B 13/0015* (2013.01); *G02B 13/0045* (2013.01); *G02B 13/18* (2013.01); *G02B 27/0025* (2013.01)

(58) Field of Classification Search
CPC ............... G02B 13/0045; G02B 13/18; G02B 13/0015; G02B 13/006; G02B 27/0025; G02B 9/04; G02B 5/005; G02B 13/001
USPC .................................. 359/717, 794, 740, 753
See application file for complete search history.

(56) References Cited

U.S. PATENT DOCUMENTS

2011/0235191 A1* 9/2011 Kawamura ............... G02B 9/04
                                                              359/717

FOREIGN PATENT DOCUMENTS

| JP | H11-30743 A | 2/1999 |
|---|---|---|
| JP | 2009-109723 A | 5/2009 |

* cited by examiner

*Primary Examiner* — Evelyn A Lester
(74) *Attorney, Agent, or Firm* — Carter, DeLuca, Farrell & Schmidt, LLP

(57) ABSTRACT

An optical system includes, in order from object side: a positive first lens unit; and a positive second lens unit moving during focusing. The second lens unit includes, in order from object side, a front unit, an aperture stop, and a positive rear unit. The first unit includes a negative lens that has a convex surface facing object side and is arranged closest to object side, and three or more positive lenses on image side of the negative lens. A distance, on optical axis, from a lens surface on object side of a second positive lens counted from image side of the three or more positive lenses to a lens surface closest to image side of the first unit, and a distance, on optical axis, between a lens surface closest to object side and that closest to image side of the first unit are each appropriately set.

13 Claims, 9 Drawing Sheets

OPTICAL SYSTEM AND IMAGE PICKUP APPARATUS INCLUDING THE SAME

BACKGROUND OF THE INVENTION

1. Field of the Invention

The present invention relates to an optical system suitable for being used as an image pickup optical system to be used in an image pickup apparatus such as a silver-halide film camera, a digital still camera, a digital video camera, a monitoring camera, and a TV camera.

2. Description of the Related Art

In recent years, an image pickup optical system to be used in an image pickup apparatus has been required to have high optical characteristic, a wide field angle, and a large aperture ratio.

Japanese Patent Application Laid-Open Nos. H11-30743 and 2009-109723 disclose a retrofocus type lens which includes a first lens unit having a negative refractive power and a second lens unit having a positive refractive power in order from an object side to an image side.

A structure in which refractive power arrangement is made asymmetric with respect to an aperture stop is known as a structure for realizing an image pickup optical system having a wide field angle and a large aperture ratio. However, when the refractive power arrangement is made asymmetric with respect to the aperture stop, many various aberrations (specifically, high-order various aberrations) are generated. A coma in a sagittal direction (in a direction concentric with respect to an optical axis) is known as one of the high-order various aberrations and is called a sagittal coma flare.

In order to realize the image pickup optical system having the wide field angle and the large aperture ratio, it is important to satisfactorily correct the sagittal coma flare. To satisfactorily correct the sagittal coma flare while the large aperture ratio and the wide field angle are realized to obtain the high optical characteristic in the image pickup optical system including two lens units, it is important to appropriately set the refractive power and lens structure of the first lens unit, the refractive power and lens structure of the second lens unit, and the like.

SUMMARY OF THE INVENTION

According to one embodiment of the present invention, there is provided an optical system, comprising, in order from an object side to an image side: a first lens unit having a positive refractive power; and a second lens unit having a positive refractive power and being configured to move during focusing, the second lens unit including, in order from the object side to the image side, a front unit, an aperture stop, and a rear unit having a positive refractive power, the first lens unit including a negative lens that has a convex surface facing the object side and is arranged closest to the object side, and three or more positive lenses on the image side of the negative lens, in which the following conditional expression is satisfied: 0.15<PL/D1<0.50 where PL denotes a distance, on the optical axis, from a lens surface on the object side of a second positive lens counted from the image side of the three or more positive lenses included in the first lens unit to a lens surface closest to the image side of the first lens unit, and D1 denotes a distance, on the optical axis from a lens surface closest to the object side of the first lens unit to a lens surface closest to the image side of the first lens unit.

Further features of the present invention will become apparent from the following description of exemplary embodiments with reference to the attached drawings.

DESCRIPTION OF THE EMBODIMENTS

Now, exemplary embodiments of the present invention are described in detail with reference to the attached drawings. An optical system of the present invention comprises, in order from an object side to an image side, a first lens unit which has a positive refractive power and a second lens unit which has a positive refractive power and which is moved on an optical axis during focusing. The second lens unit includes a front unit, an aperture stop, and a rear unit having a positive refractive power in order from the object side to the image side.

Figure 1:
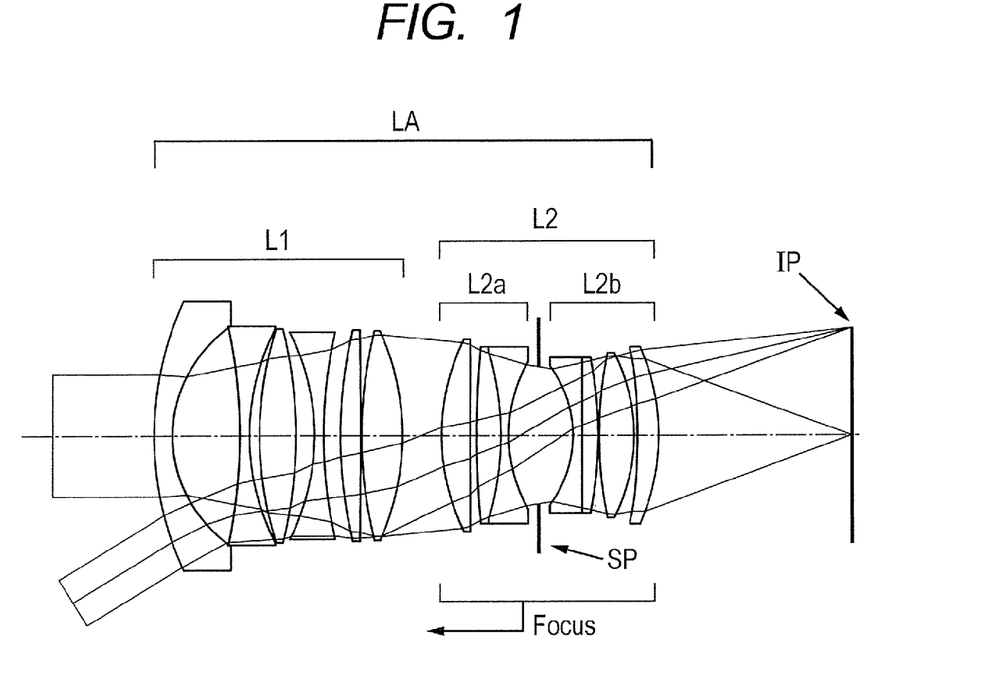
FIG. 1 is a cross-sectional view of a lens according to Example 1 of the present invention.
Figure 2A:
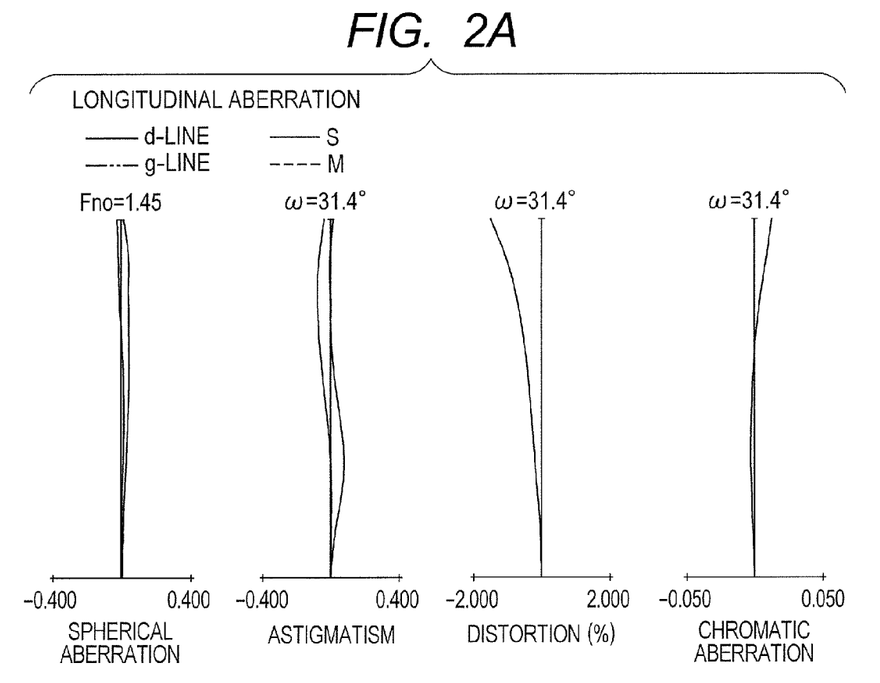
FIG. 2A is a longitudinal aberration diagram when an object distance is infinity in the lens of Example 1.
Figure 2B:
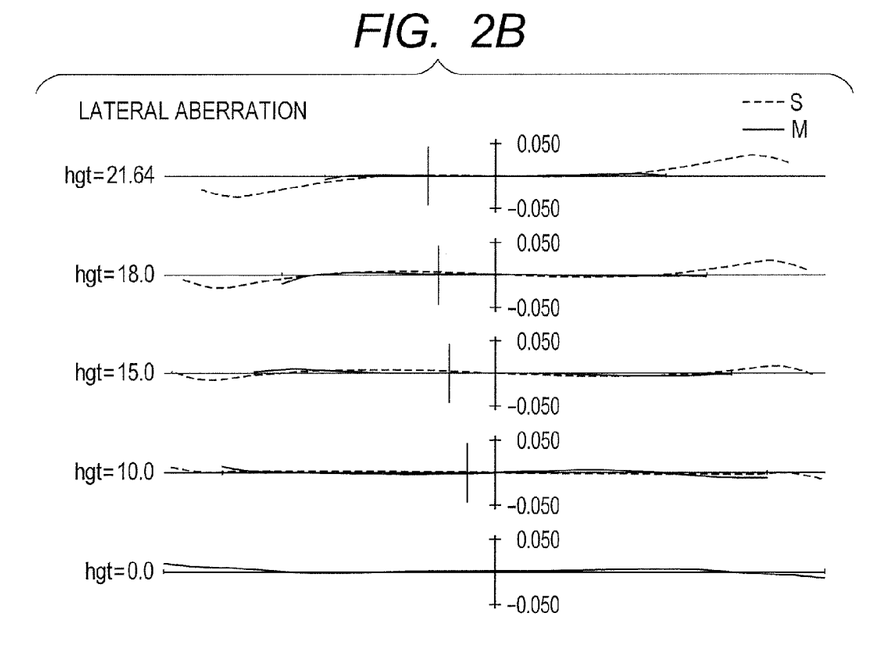
FIG. 2B is a lateral aberration diagram when an object distance is infinity in the lens of Example 1.
Figure 3:
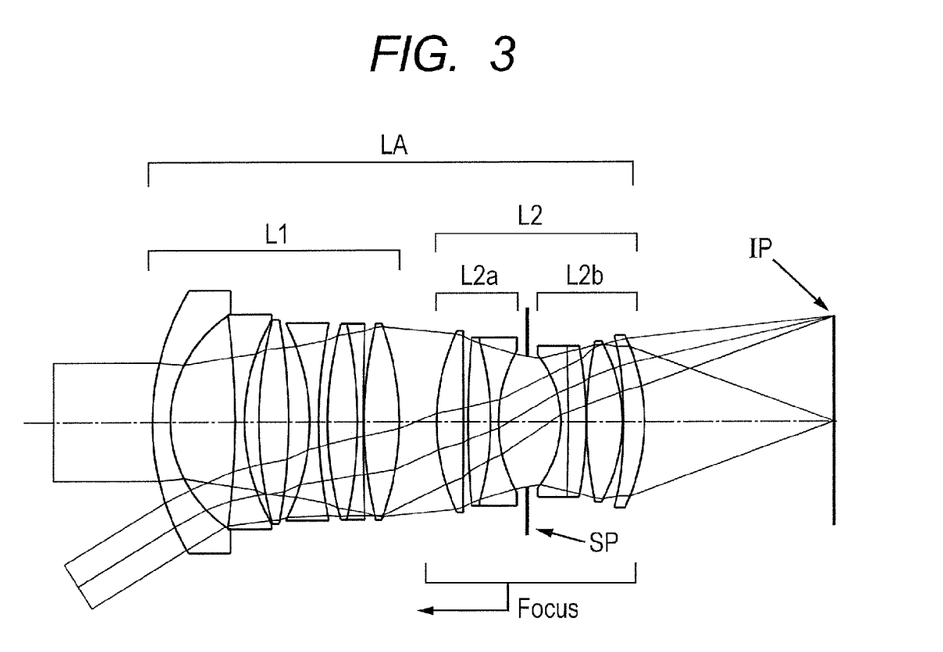
FIG. 3 is a cross-sectional view of a lens according to Example 2 of the present invention.
Figure 4A:
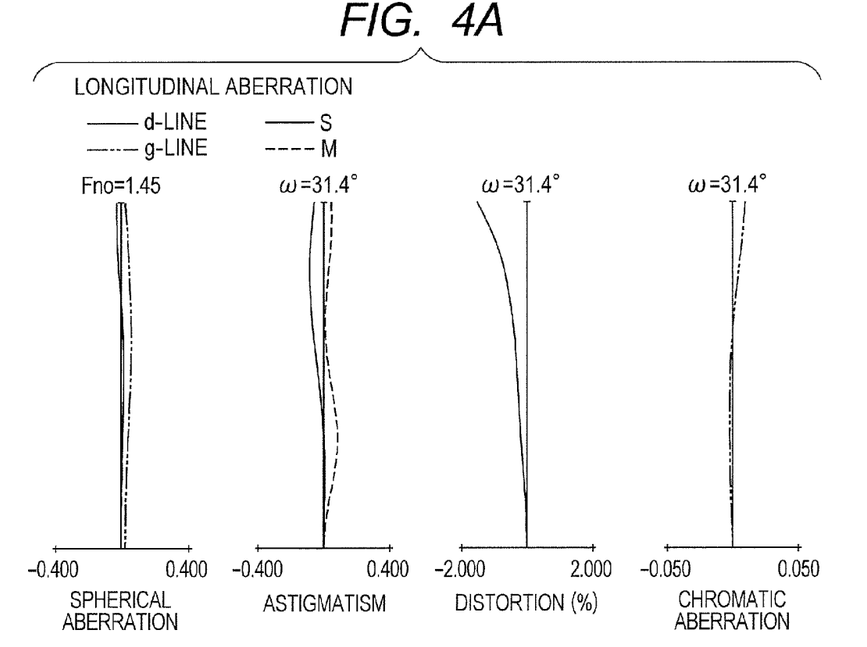
FIG. 4A is a longitudinal aberration diagram when an object distance is infinity in the lens of Example 2.
Figure 4B:
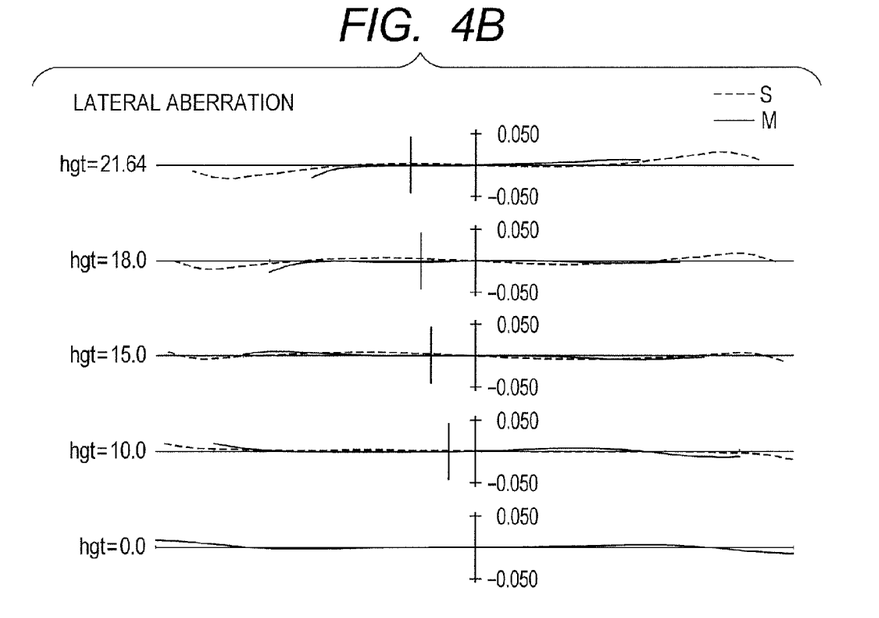
FIG. 4B is a lateral aberration diagram when an object distance is infinity in the lens of Example 2.
Figure 5:
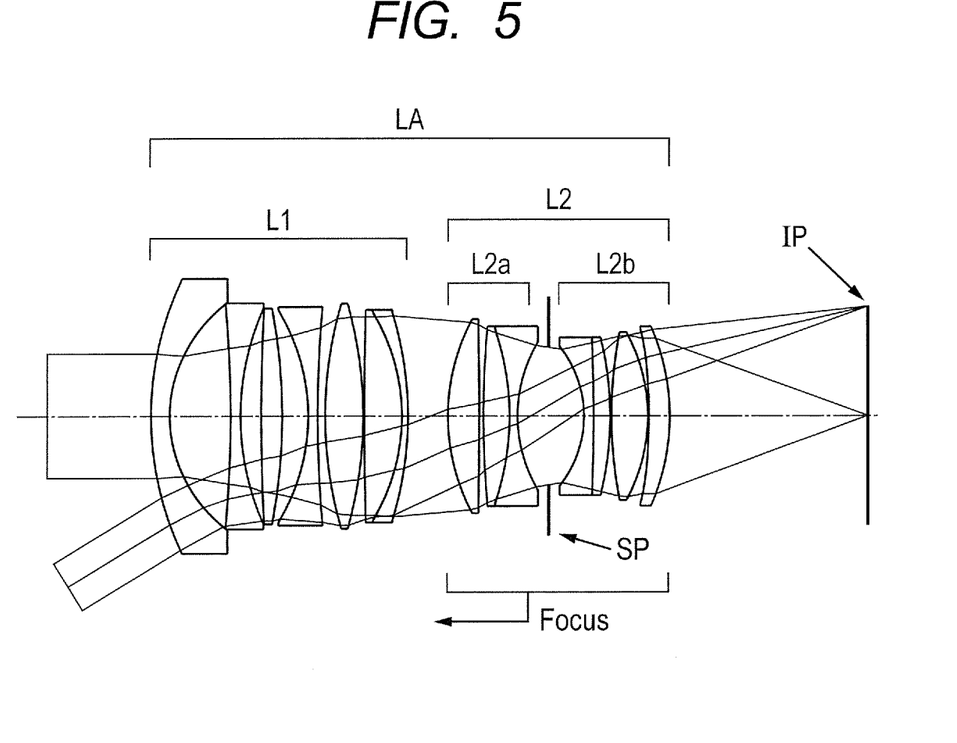
FIG. 5 is a cross-sectional view of a lens according to Example 3 of the present invention.
Figure 6A:
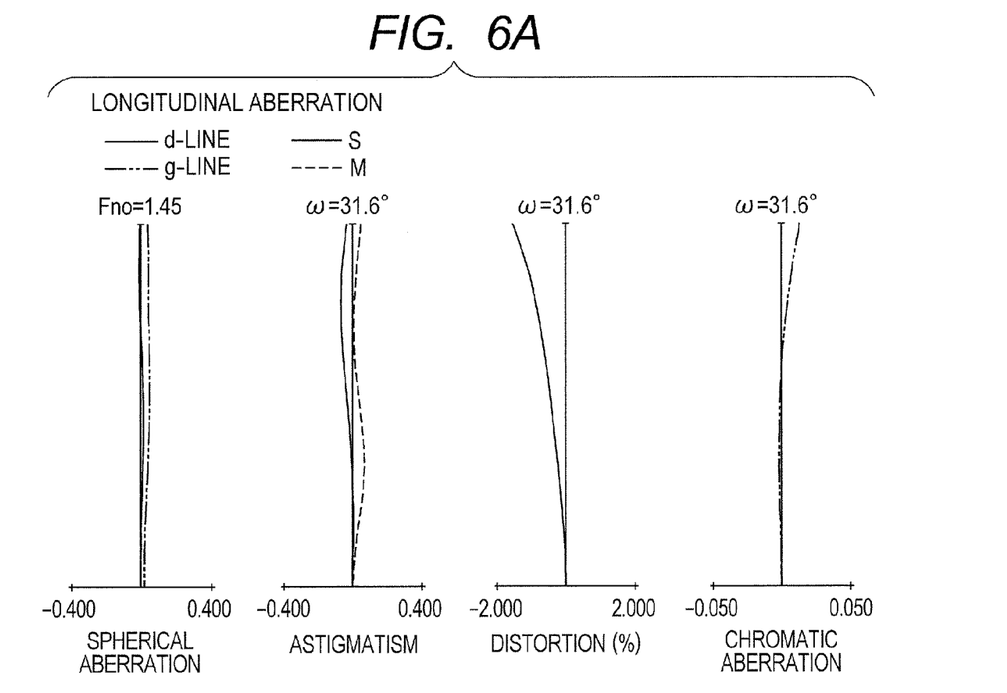
FIG. 6A is a longitudinal aberration diagram when an object distance is infinity in the lens of Example 3.
Figure 6B:
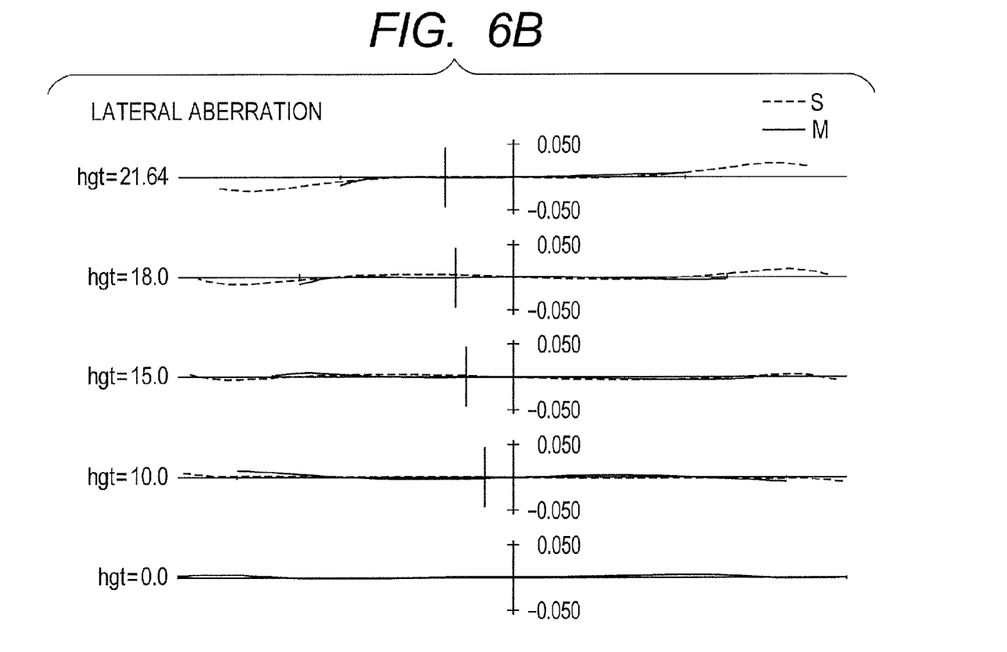
FIG. 6B is a lateral aberration diagram when an object distance is infinity in the lens of Example 3.

FIG. 1 is a cross-sectional view of a lens (optical system) according to Example 1 of the present invention. FIGS. 2A and 2B are respectively a longitudinal aberration diagram and a lateral aberration diagram when the lens of Example 1 is focused at infinity. FIG. 3 is a cross-sectional view of a lens according to Example 2 of the present invention. FIGS. 4A and 4B are respectively a longitudinal aberration diagram and a lateral aberration diagram when the lens of Example 2 is focused at infinity. In addition, FIG. 5 is a cross-sectional view of a lens according to Example 3 of the present invention. FIGS. 6A and 6B are respectively a longitudinal aberration diagram and a lateral aberration diagram when the lens of Example 3 is focused at infinity.

Figure 7:
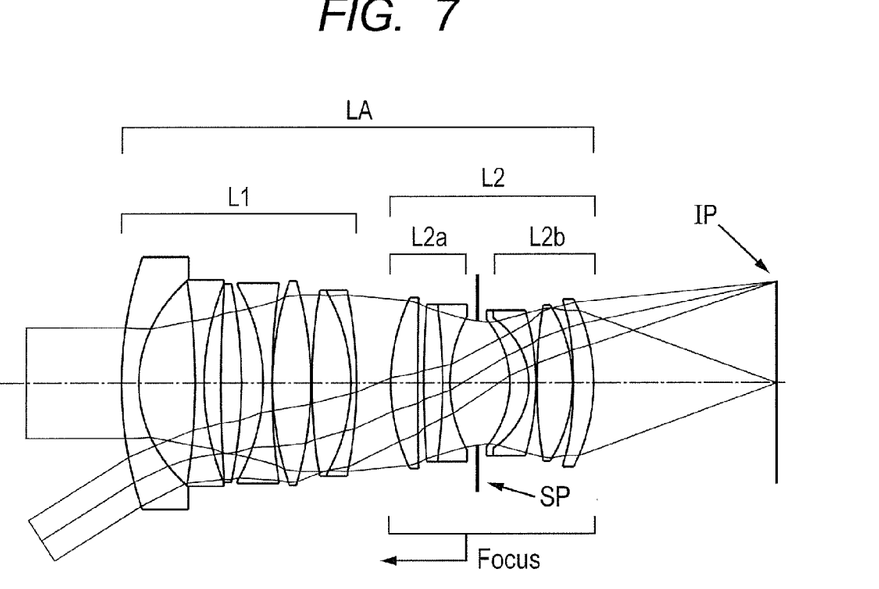
FIG. 7 is a cross-sectional view of a lens according to Example 4 of the present invention.
Figure 8A:
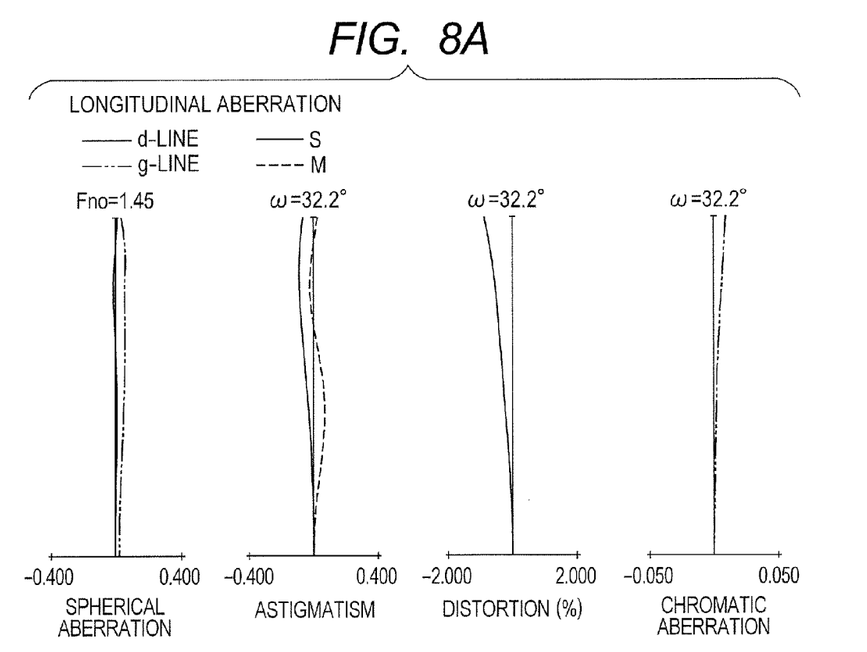
FIG. 8A is a longitudinal aberration diagram when an object distance is infinity in the lens of Example 4.
Figure 8B:
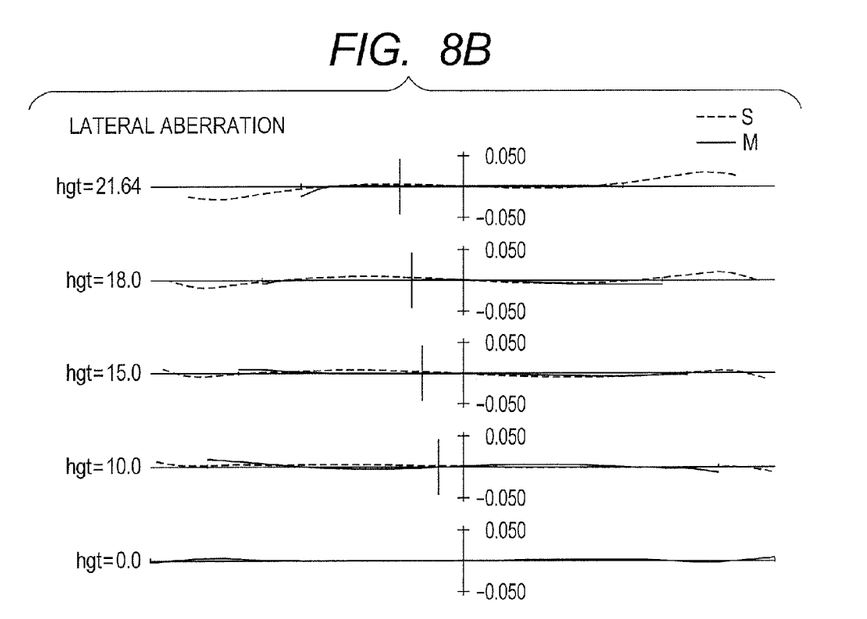
FIG. 8B is a lateral aberration diagram when an object distance is infinity in the lens of Example 4.
Figure 9:
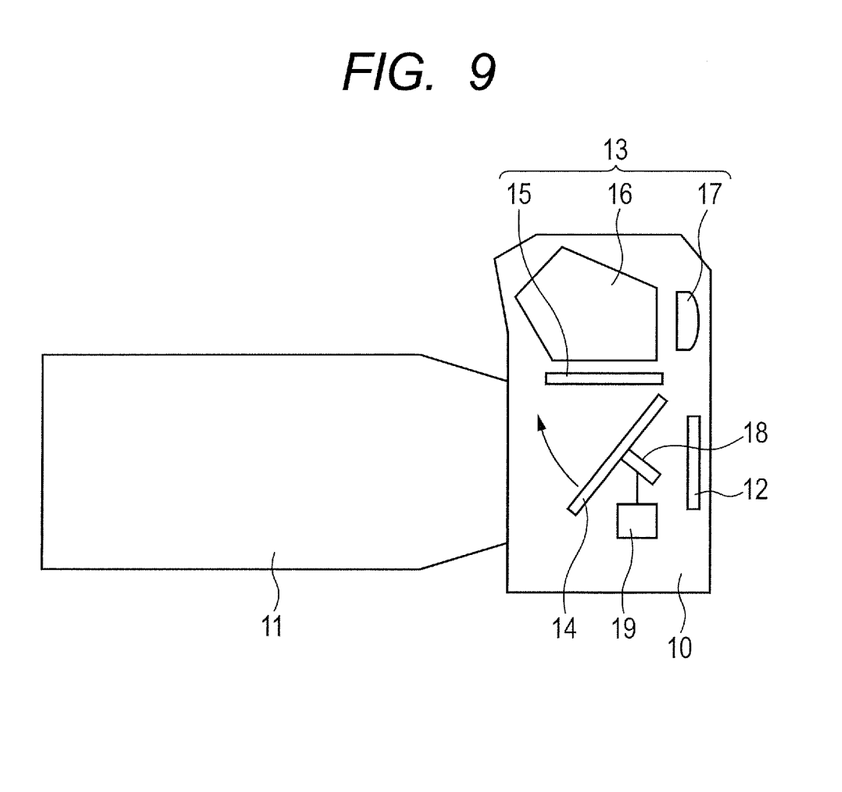
FIG. 9 is a schematic view of a main part of an image pickup apparatus of the present invention.

FIG. 7 is a cross-sectional view of a lens according to Example 4 of the present invention. FIGS. 8A and 8B are respectively a longitudinal aberration diagram and a lateral aberration diagram when the lens of Example 4 is focused at infinity. In addition, FIG. 9 is a schematic view of a camera (image pickup apparatus) including the optical system of the present invention.

The optical system according to each of the examples is an image pickup optical system to be used in an image pickup apparatus such as a digital still camera, a digital video camera, or a silver-halide film camera. In the cross-sectional view of the lens, the left is the object side (front side) and the right is the image side (rear side). Note that, the optical system of each of the examples may be used as a projection lens of a projector or the like. In this case, the left is a screen side, and the right is a projected image side.

In the cross-sectional view of the lens, an optical system LA includes a first lens unit L1 having a positive refractive power and a second lens unit L2 having a positive refractive power in order from the object side to the image side. The second lens unit L2 includes a front unit L2a having a positive or negative refractive power, an aperture stop SP, and a rear unit L2b having a positive refractive power in order from the object side to the image side. When the optical system is used as an image pickup optical system of a digital video camera or a digital still camera, an imaging plane IP corresponds to an image pickup surface of a solid-state image pickup element (photo-electric conversion element) such as a CCD sensor or a CMOS sensor. In a case of a silver-halide film camera, the imaging plane IP corresponds to a film surface thereof.

The longitudinal aberration diagram shows a spherical aberration, an astigmatism, a distortion, and a chromatic aberration of magnification in order from the left. In the longitudinal aberration diagram showing the spherical aberration and the chromatic aberration of magnification, a solid line indicates a d-line (587.6 nm), and a two-dot chain line indicates a g-line (435.8 nm). In addition, in the longitudinal aberration diagram showing the astigmatism, a solid line S indicates a sagittal direction of the d-line, and a broken line M indicates a meridional direction of the d-line. The longitudinal aberration diagram showing the distortion indicates a distortion in the d-line. In addition, symbol Fno denotes an F number, and symbol ω denotes a half field angle (degree).

In the lateral aberration diagram, symbol hgt denotes an image height. The lateral aberration diagram shows, in order from the bottom, the lateral aberrations generated when the image heights are 0 mm, 10 mm, 15 mm, 18 mm, and 21.64 mm, respectively. In addition, a solid line M indicates an aberration in the meridional direction, and a broken line S indicates an aberration in the sagittal direction.

The optical system of each of the examples is a fixed-focal length optical system including a first lens unit L1 having a positive refractive power and a second lens unit L2 having a positive refractive power in order from the object side to the image side. In the first lens unit L1, a meniscus-shaped negative lens having a convex surface facing the object side is arranged closest to the object side. The negative refractive powers are concentrated toward the object side within the first lens unit L1 to achieve the so-called retrofocus type refractive power arrangement. In addition, in the entire lens system as well in which the first lens unit L1 having the positive refractive power is arranged together with the second lens unit L2 having the positive refractive power, the retrofocus type refractive power arrangement is achieved, to thereby construct the optical system whose focal length is shorter than the total lens length (the distance from the first lens surface to the image surface).

As a result, for example, an image pickup optical system is realized which is useful in the image pickup apparatus requiring a long back focus in order to arrange a quick return mirror on the image side. The second lens unit L2 includes a front unit L2a having a positive or negative refractive power, an aperture stop SP, and a rear unit L2b having a positive refractive power in order from the object side to the image side. In an optical system having a large aperture ratio, a diameter (internal diameter) of the aperture stop SP for determining a diameter of an on-axial beam (Fno light flux) for detecting the F number is large.

In an image pickup optical system in which the internal diameter of the aperture stop SP varies depending on the photographing conditions, a mechanism for driving a diaphragm blade is arranged in the vicinity of the aperture stop SP. Therefore, an external diameter of the aperture stop SP becomes large and hence the driving mechanism is also increased in size. For this reason, it is desired that the aperture stop SP be arranged in a position where the internal diameter of the aperture stop SP is reduced as much as possible. In the optical system of the present invention, the second lens unit L2 is constructed in the manner as described above so that the aperture stop SP can be arranged in a position where the on-axial beam is most converged. With regard to the focusing from the infinity to a short distance (proximity object), the second lens unit L2 is moved on the optical axis to the object side.

By adopting such a structure, the focusing is readily carried out from the infinity to the short distance with a small aberration variation due to the focusing, and a relatively small driving amount (movement amount). In the optical system having the large aperture ratio of each of the examples, when the second lens unit L2 serves as the focus lens unit is increased in size, a large load is applied to the focus driving mechanism.

Then, the optical system of each of the examples adopts the structure in which the first lens unit L1 has the positive refractive power as a whole, and the converged light enters the second lens unit L2. As a result, the increase in the lens effective diameter of the second lens unit L2 is suppressed, to thereby reduce the load applied to the focus driving mechanism. Note that, in each of the examples, the second lens unit L2 may be divided into a plurality of internal lens sections, and those internal lens sections may be moved so as to draw different loci, to thereby carry out the focusing.

For example, when the front unit L2a on the object side with respect to the aperture stop SP, and the aperture stop SP and the rear unit L2b are moved so as to draw different loci, to thereby carry out the focusing, the variation of the field curvature aberration due to the focusing can be further suppressed. As a result, the high optical characteristic can be easily obtained in the focusing on the short distance. In addition, the first lens unit L1 may also be moved on the optical axis during the focusing. As a result, the aberration variation during the focusing can be easily reduced.

Although in the optical system of each of the examples, the first lens unit L1 has the positive refractive power as a whole, a plurality of lenses each having the negative refractive power are concentrically arranged toward the object side of the first lens unit L1, to thereby obtain the so-called retrofocus type refractive power arrangement. As a result, the optical system of each of the examples can have the wide field angle and the short focal length while the sufficiently long back focus is ensured.

When the optical system having the small F number and the large aperture ratio in addition to the wide field angle is to be realized, the light needs to be converged through a strong positive refracting surface to be guided to the image surface. For this reason, various high-order aberrations are greatly generated in the strong positive refracting surface. In order to cope with this situation, in the optical system of each of the examples, the lens surfaces each having the strong negative refractive power are arranged before and after the aperture stop SP of the second lens unit L2, to thereby satisfactorily correct the various aberrations such as the spherical aberration and the coma up to the high order ones.

On the other hand, the strong negative refracting surfaces arranged before and after the aperture stop SP may greatly generate the coma in the sagittal direction (in the direction concentric with respect to the optical axis). In the optical system having the large aperture ratio and the wide field angle, a width of the light flux in the sagittal direction becomes larger than in the meridional direction (the radial direction from the optical axis) in the more periphery of the screen (with an increase in the image height). Thus, the coma tends to be extremely greatly generated, and hence those aberrations become difficult to correct.

Then, in each of the examples, the positive lenses are concentrically arranged in the position where the width of the light flux of an off-axis ray becomes large to cancel the coma in the sagittal direction, which is greatly generated in the negative refracting surfaces arranged before and after the aperture stop SP, with the positive refractive powers of the positive lenses, to thereby satisfactorily correct the coma in the sagittal direction.

Specifically, the position where the width of the light flux of the off-axis ray becomes large is within a range on the image side within the first lens unit L1. As described above, the first lens unit L1 has the structure in which in order that the entire lens system may have the retrofocus type refractive power arrangement, the lenses each having the negative refractive power are concentrically arranged in the range on the object side. For this reason, in the range on the image side within the first lens unit L1, the width of the on-axial beam (Fno light flux) becomes large, and a marginal ray thereof passes through the highest position from the optical axis in the entire lens system. In addition, in the above-mentioned range, the main ray of the off-axis light flux passes through a lower position with respect to the optical axis than that of the on-axial beam, and passes through the lens surface with the width of the light flux increased.

Then, a large number of positive lenses each having a function of converging the light diverged in the sagittal direction are provided at positions where the width of the light flux is large, to thereby satisfactorily correct even the high-order sagittal coma. For this reason, in the optical system of each of the examples, three or more positive lenses are arranged within the first lens unit L1 of the retrofocus type in which the lenses each having the negative refractive power are arranged ahead of the positive lenses as a whole. Among the three or more positive lenses, the second positive lens counted from the image side is arranged in a range on the image side within the first lens unit L1.

Specifically, a distance, on the optical axis, from the lens surface on the object side of the second positive lens counted from the image side among the positive lenses included in the first lens unit L1 to the lens surface closest to the image side of the first lens unit L1 denoted by PL. A distance, on the optical axis, from the lens surface closest to the object side of the first lens unit L1 to the lens surface closest to the image side of the first lens unit L1 is denoted by D1. In this case, the following conditional expression is satisfied.

$$0.15 < PL/D1 < 0.50 \quad (1)$$

When a ratio of the range in which the two positive lenses are arranged to the total length of the first lens unit L1 is small and exceeds a lower limit of the conditional expression (1), the total length of the first lens unit L1 becomes too large and hence the entire lens system is increased in size. On the other hand, when the ratio of the range in which the two positive lenses are arranged to the total length of the first lens unit L1 is large and exceeds an upper limit of the conditional expression (1), the positive lenses are concentrically arranged in the range in which the width of the light flux becomes large, and hence the effect of correcting the sagittal coma is reduced. It is more preferred to set the numerical value range of the conditional expression (1) as follows.

$$0.22 < PL/D1 < 0.40 \quad (1a)$$

The optical system having the high performance and the wide field angle in addition to the large aperture ratio, in which the spherical aberration and the sagittal coma flare are satisfactorily corrected is obtained by satisfying the configuration requirement described above, but it is more preferred that the optical system take one or more configurations described below. A first configuration is to arrange three or more negative lenses in the first lens unit L1. In order that the entire first lens unit L1 may have the retrofocus type refractive power arrangement, the negative lens is arranged closest to the object side. However, even for the suppression of the increase in the aberration due to the large aperture ratio, it is desired to arrange three or more negative lenses to take partial charge of the negative refractive power.

In addition, it is efficient from a viewpoint of achieving the first lens unit L1 having the retrofocus type refractive power arrangement to arrange the three or more negative lenses on the object side with respect to the second positive lens counted from the image side within the first lens unit L1. In addition, even for guiding the light having the large width of the light flux to the two positive lenses arranged on the image side to easily correct the sagittal coma, it is efficient to arrange the three or more negative lenses toward the object side within the first lens unit L1.

Even for achieving the entire lens system having the retrofocus, which includes the second lens unit L2 arranged on the image side of the first lens unit L1, or preventing the excessively large aberration from being generated within the first lens unit L1, it is desired to appropriately set the retrofocus type refractive power arrangement of the first lens unit L1. Specifically, a distance from the lens surface closest to the image side of the first lens unit L1 to the rear principal point of the first lens unit L1 is denoted by ok1. In this case, it is preferred to satisfy the following conditional expression.

$$1.0 < ok1/D1 < 3.0 \quad (2)$$

In this case, with respect to a sign of the distance ok1, a direction from the lens surface closest to the image side of the first lens unit L1 toward the image side is set as positive, while a direction from the lens surface closest to the image side of the first lens unit L1 toward the object side is set as negative. Although the first lens unit L1 has the retrofocus type refractive power arrangement, the entire first lens unit L1 is constructed so as to have the positive refractive power. For this reason, the rear principal point described above exists on the image side more with respect to the lens surface closest to the image side of the first lens unit L1. That is, the distance ok1 takes a value having the positive sign. In addition, it is preferred to satisfy the conditional expression (2) described above.

When the rear principal point of the first lens unit L1 is close to the first lens unit L1 and exceeds a lower limit of the conditional expression (2), the positive refractive power within the first lens unit L1 becomes too strong, and many various aberrations are generated, and hence the various aberrations become difficult to correct at this time. In addition, when the rear principal point of the first lens unit L1 is far from the first lens unit L1 and exceeds an upper limit of the conditional expression (2), the light which is sufficiently converged does not enter the second lens unit L2. Therefore, the second lens unit L2 is increased in size, and the entire optical system is increased in size. It is more preferred to set the numerical value range of the conditional expression (2) as follows.

$$1.2 < ok1/D1 < 2.5 \quad (2a)$$

In addition, although in the optical system of each of the examples, the focusing is carried out by moving the second lens unit L2 having the positive refractive power on the optical axis, for reducing the aberration variation during the focusing at this time, it is preferred to adopt the following configuration. A focal length of the first lens unit L1 is denoted by f1, and a focal length of the second lens unit L2 is denoted by f2. In this case, it is preferred to satisfy the following conditional expression.

$$1.5 < f1/f2 < 5.0 \quad (3)$$

When the refractive power of the second lens unit L2 becomes too weak and exceeds a lower limit of the conditional expression (3), the movement amount for the driving during the focusing made on the short distance becomes large, and hence the entire lens system is increased in size. When the refractive power of the second lens unit L2 becomes too strong and exceeds an upper limit of the conditional expression (3), it becomes difficult to maintain the back focus having the sufficient length. It is more preferred to set the numerical value range of the conditional expression (3) as follows.

$$2.0 < f1/f2 < 4.0 \quad (3a)$$

According to each of the examples, by adopting the configurations described above, the high-performance optical system having the large aperture ratio is obtained, in which the spherical aberration and the sagittal coma flare are satisfactorily corrected. Note that, in each of the examples, it is preferred to adopt the following configuration.

It is preferred to arrange three or more negative lenses on the object side with respect to the second positive lens counted from the image side among the positive lenses included in the first lens unit L1.

It is preferred that the height of the marginal ray of the on-axial beam from the optical axis be highest in the lens within the first lens unit L1 of the entire lens system. As a result, it becomes easy to guide the sufficiently converged light to the second lens unit L2. It is preferred that the first lens unit L1 include a negative lens having a convex surface facing the object side, a negative lens, a positive lens, a negative lens, and a positive lens in order from the object side to the image side. As a result, the first lens unit L1 can be realized with a relatively small number of lenses.

It is preferred that at least one of the first positive lens and the second positive lens counted from the image side of the first lens unit L1 be cemented to a negative lens, namely, a cemented lens. In this case, it is preferred that a cemented surface of the cemented lens turns its concave surface to the object side. As a result, the appropriate negative refractive power can be arranged in the vicinity of the two positive lenses described above, and hence the sagittal coma flare can be more satisfactorily corrected.

It is preferred to adopt the following configuration when the optical system of the present invention is applied to an image pickup apparatus including an image pickup element. It is preferred that two or more positive lenses included in the first lens unit L1 be arranged in a region in which a height, from the optical axis, of the main ray of the light flux which reaches a maximum image height of an imaging plane of the image pickup element is lower than a height of the marginal ray of the on-axial beam from the optical axis. As a result, the sagittal coma flare can be satisfactorily corrected in the entire screen region from the on-axis ray to the off-axis ray.

Next, the lens structure of the optical system of each of the examples is described. An optical system of Example 1 has a wide field angle and retrofocus type refractive power arrangement. The first lens unit L1 having the positive refractive power as a whole includes, in order from the object side to the image side, a negative lens having a convex surface facing the object side, a negative lens having a double-concave shape, a positive lens having a double-convex shape, a negative lens having a double-concave shape, a positive lens having a double-convex shape, and a positive lens having a double-convex shape.

A plurality of negative lenses are concentrically arranged toward the object side of the first lens unit L1, and two positive lenses are continuously arranged toward the image side of the first lens unit L1 in which the light flux becomes large. In addition, the second lens unit L2 having the positive refractive power includes the front unit L2a having the positive refractive power, the aperture stop SP, and the rear unit L2b having the positive refractive power in order from the object side to the image side. The focusing from the infinity to the short distance is carried out by moving the second lens unit L2 to the object side. As can be seen from the aberration diagrams, in Example 1, even the high-order aberrations of the spherical aberration and sagittal coma are satisfactorily corrected.

An optical system of Example 2 has the wide field angle and the so-called retrofocus type refractive power arrangement. The first lens unit L1 having the positive refractive power as a whole includes, in order from the object side to the image side, a negative lens having a convex surface facing the object side, a negative lens having a double-concave shape, a positive lens having a double-convex shape, a negative lens having a double-concave shape, a cemented positive lens which is obtained by cementing a positive lens and a negative lens to each other, and a positive lens having a double-convex shape.

A plurality of negative lenses are concentrically arranged toward the object side of the first lens unit L1, and two positive lenses are continuously arranged toward the image side of the first lens unit L1 in which the light flux becomes large. In addition, the second lens unit L2 having the positive refractive power includes the front unit L2a having the positive refractive power, the aperture stop SP, and the rear unit L2b having the positive refractive power in order from the object side to the image side. The focusing from the infinity to the short distance is carried out by moving the second lens unit L2 to the object side. As can be seen from the aberration diagrams, in Example 2, even the high-order aberrations of the spherical aberration and sagittal coma are satisfactorily corrected.

An optical system of Example 3 has the wide field angle and the so-called retrofocus type refractive power arrangement. The first lens unit L1 having the positive refractive power as a whole includes, in order from the object side to the image side, a negative lens having a convex surface facing the object side, a negative lens having a double-concave shape, a positive lens having a double-convex shape, a negative lens having a double-concave shape, a positive lens having a double-convex shape, and a cemented positive lens which is obtained by cementing a positive lens and a negative lens to each other.

A plurality of negative lenses are concentrically arranged toward the object side of the first lens unit L1, and two positive lenses are continuously arranged toward the image side of the first lens unit L1 in which the light flux becomes large. In addition, the second lens unit L2 having the positive refractive power includes the front unit L2a having the positive refractive power, the aperture stop SP, and the rear unit L2b having the positive refractive power in order from the object side to the image side. The focusing from the infinity to the short distance is carried out by moving the second lens unit L2 to the object side. As can be seen from the aberration diagrams, in Example 3, even the high-order aberrations of the spherical aberration and sagittal coma are satisfactorily corrected.

An optical system of Example 4 has the wide field angle and the so-called retrofocus type refractive power arrangement. The first lens unit L1 having the positive refractive power as a whole includes, in order from the object side to the image side, a negative lens having a convex surface facing the object side, a negative lens having a double-concave shape, a positive lens having a double-convex shape, a negative lens having a double-concave shape, a positive lens having a double-convex shape, and a cemented positive lens which is obtained by cementing a positive lens and a negative lens to each other.

A plurality of negative lenses are concentrically arranged toward the object side of the first lens unit L1, and two positive lenses are continuously arranged toward the image side of the first lens unit L1 in which the light flux becomes large. In addition, the second lens unit L2 having the positive refractive power includes the front unit L2a having the positive refractive power, the aperture stop SP, and the rear unit L2b having the positive refractive power in order from the object side to the image side. The focusing from the infinity to the short distance is carried out by moving the second lens unit L2 to the object side. As can be seen from the aberration diagrams, in Example 4, even the high-order aberrations of the spherical aberration and sagittal coma are satisfactorily corrected.

Next, a single-lens reflex camera system (image pickup apparatus) according to one embodiment of the present invention, which includes the optical system of the present invention, is described with reference to FIG. 9. In FIG. 9, the single-lens reflex camera system includes a single-lens reflex camera main body 10. An interchangeable lens 11 includes the optical system according to the present invention. A recording unit 12 corresponding to a film or an image pickup element is provided to receive light of an image obtained through the interchangeable lens 11. A finder optical system 13 is provided to observe a subject image from the interchangeable lens 11. A quick return mirror 14 is turned to transmit the subject image formed in the interchangeable lens 11 to one of the recording unit 12 and the finder optical system 13.

When the subject image is to be observed using a finder, the subject image formed on a focusing plate 15 through the quick return mirror 14 is converted into an erect image by a penta prism 16, and then enlarged for observation using an eyepiece optical system 17. In photographing, the quick return mirror 14 is turned in a direction indicated by the arrow, and the subject image is formed on and recorded in the recording unit 12. The single-lens reflex camera system further includes a sub-mirror 18 and a focus point detector 19.

By applying the optical system of the present invention to the image pickup apparatus such as the single-lens reflex camera including the interchangeable lens or the like, the image pickup apparatus having the high optical characteristic can be realized. Note that, the optical system of the present invention can be similarly applied to a single-lens reflex camera without a quick return mirror. In addition, the optical system of the present invention can be similarly applied to a projection lens for a projector.

Next, Numerical Examples 1 to 4 corresponding to Examples 1 to 4 of the present invention are described. In each of the numerical examples, surface number i denotes an order from the object side, symbol ri denotes a curvature radius of an i-th surface in order from the object side, and symbol di denotes a lens thickness or air interval between the i-th surface and an (i+1)th surface in order from the object side. In addition, symbol ndi denotes a refractive index on the d-line of the material of an optical member arranged between the i-th surface and the (i+1)th surface in order from the object side, and symbol vdi denotes an Abbe number thereof on the d-line. An aspheric coefficient is expressed by Equation below:

$$X = \frac{(1/R)}{1 + \sqrt{1-(1+K)(H/R)^2}} + A4H^4 + A6H^6 + A8H^8 + A10H^{10} + A12H^{12}$$

where the X-axis corresponds to the optical axis direction, the H-axis corresponds to the direction perpendicular to the optical axis, the light propagation direction is positive, symbol R denotes a paraxial curvature radius, and symbols K, A4, A6, A8, A10, and A12 denote aspherical coefficients, respectively. In each numerical example, a back focus (BF) corresponds to a distance between the lens end surface and the paraxial image plane. The total lens length is a distance between the surface closest to the object side and the final lens surface plus the back focus. In addition, correspondence between each numerical example and the above-mentioned conditional expression is shown in Table 1.

NUMERICAL EXAMPLE 1

| Unit mm | | | | |
|---|---|---|---|---|
| Surface data | | | | |
| Surface number | r | d | nd | vd |
| 1 | 62.581 | 3.67 | 1.58313 | 59.4 |
| 2* | 25.696 | 13.70 | | |
| 3 | −102.612 | 1.93 | 1.48749 | 70.2 |
| 4 | 46.007 | 2.24 | | |
| 5 | 72.682 | 7.07 | 1.91082 | 35.3 |
| 6 | −93.316 | 3.65 | | |
| 7 | −47.186 | 1.84 | 1.67270 | 32.1 |
| 8 | 92.285 | 3.38 | | |
| 9 | 95.078 | 4.11 | 1.75500 | 52.3 |
| 10 | −703.628 | 0.20 | | |
| 11 | 79.989 | 8.34 | 1.49700 | 81.5 |
| 12 | −51.260 | 7.78 | | |
| 13 | 46.086 | 5.51 | 1.91082 | 35.3 |
| 14 | 3926.015 | 1.51 | | |
| 15 | 174.984 | 4.90 | 1.49700 | 81.5 |
| 16 | −60.342 | 1.56 | 1.65412 | 39.7 |
| 17 | 30.716 | 5.98 | | |
| 18 (Stop) | ∞ | 6.96 | | |
| 19 | −23.207 | 1.86 | 1.75520 | 27.5 |
| 20 | 687.472 | 3.48 | 1.59522 | 67.7 |
| 21 | −75.684 | 0.28 | | |
| 22 | 83.032 | 7.12 | 1.59522 | 67.7 |
| 23 | −36.627 | 0.52 | | |
| 24* | −165.342 | 4.42 | 1.85400 | 40.4 |
| 25 | −43.794 | | | |

-continued

Unit mm

Aspherical surface data

Second surface

K = 0.00000e+000  A4 = −1.23353e−006  A6 = −5.77048e−009
A8 = 1.20270e−011  A10 = −2.89347e−014  A12 = 1.81064e−017

Twenty-fourth surface

K = 0.00000e+000  A4 = −6.59372e−006  A6 = −5.86159e−010
A8 = −3.77096e−012  A10 = −2.14714e−015  A12 = 6.22348e−018

| | |
|---|---|
| Focal length | 35.47 |
| F number | 1.45 |
| Half field angle (degree) | 31.38 |
| Image height | 21.64 |
| Total lens length | 141.37 |
| BF | 39.37 |

Each unit data

| | |
|---|---|
| f1 | 159.72 |
| f2 | 56.74 |
| PL | 12.65 |
| D1 | 50.14 |
| ok1 | 86.06 |

NUMERICAL EXAMPLE 2

Unit mm

Surface data

| Surface number | r | d | nd | vd |
|---|---|---|---|---|
| 1 | 52.560 | 3.67 | 1.58313 | 59.4 |
| 2* | 25.389 | 13.24 | | |
| 3 | −177.398 | 1.93 | 1.48749 | 70.2 |
| 4 | 42.723 | 2.83 | | |
| 5 | 78.610 | 6.08 | 1.91082 | 35.3 |
| 6 | −126.409 | 4.36 | | |
| 7 | −45.423 | 1.84 | 1.53172 | 48.8 |
| 8 | 97.064 | 2.21 | | |
| 9 | 75.538 | 6.05 | 1.49700 | 81.5 |
| 10 | −101.033 | 1.20 | 1.80518 | 25.4 |
| 11 | 588.889 | 0.20 | | |
| 12 | 88.937 | 7.10 | 1.72916 | 54.7 |
| 13 | −58.874 | 7.69 | | |
| 14 | 46.182 | 5.32 | 1.91082 | 35.3 |
| 15 | −4754.766 | 0.96 | | |
| 16 | 200.189 | 4.85 | 1.49700 | 81.5 |
| 17 | −65.143 | 1.56 | 1.65412 | 39.7 |
| 18 | 30.864 | 5.83 | | |
| 19 (Stop) | ∞ | 6.96 | | |
| 20 | −21.936 | 1.50 | 1.80518 | 25.4 |
| 21 | −132.550 | 3.20 | 1.72916 | 54.7 |
| 22 | −81.634 | 0.33 | | |
| 23 | 83.033 | 7.37 | 1.59522 | 67.7 |
| 24 | −33.741 | 0.15 | | |
| 25* | −139.898 | 4.36 | 1.85400 | 40.4 |
| 26 | −41.017 | | | |

Aspherical surface data

Second surface

K = 0.00000e+000  A4 = −1.08011e−006  A6 = −5.77575e−009
A8 = 9.49534e−012  A10 = −1.96264e−014  A12 = 5.77980e−018

Twenty-fifth surface

K = 0.00000e+000  A4 = −7.38078e−006  A6 = −2.82130e−009
A8 = 6.15573e−012  A10 = −3.38342e−014  A12 = 3.92626e−017

-continued

Unit mm

| | |
|---|---|
| Focal length | 35.42 |
| F number | 1.45 |
| Half field angle (degree) | 31.42 |
| Image height | 21.64 |
| Total lens length | 139.80 |
| BF | 39.00 |

Each unit data

| | |
|---|---|
| f1 | 147.68 |
| f2 | 55.50 |
| PL | 14.55 |
| D1 | 50.72 |
| ok1 | 73.72 |

NUMERICAL EXAMPLE 3

Unit mm

Surface data

| Surface number | r | d | nd | vd |
|---|---|---|---|---|
| 1 | 58.151 | 3.67 | 1.58313 | 59.4 |
| 2* | 26.609 | 11.23 | | |
| 3 | ∞ | 1.93 | 1.48749 | 70.2 |
| 4 | 47.766 | 4.41 | | |
| 5 | 426.728 | 3.71 | 1.91082 | 35.3 |
| 6 | −139.476 | 5.84 | | |
| 7 | −39.277 | 1.84 | 1.59551 | 39.2 |
| 8 | 305.406 | 2.09 | | |
| 9 | 84.082 | 7.09 | 1.88300 | 40.8 |
| 10 | −80.281 | 0.20 | | |
| 11 | 620.405 | 7.20 | 1.49700 | 81.5 |
| 12 | −40.008 | 1.20 | 1.75520 | 27.5 |
| 13 | −66.912 | 7.63 | | |
| 14 | 44.776 | 5.91 | 1.91082 | 35.3 |
| 15 | −1578.636 | 0.97 | | |
| 16 | 183.879 | 5.12 | 1.49700 | 81.5 |
| 17 | −53.836 | 1.56 | 1.65412 | 39.7 |
| 18 | 29.931 | 5.99 | | |
| 19 (Stop) | ∞ | 6.96 | | |
| 20 | −22.265 | 1.86 | 1.75520 | 27.5 |
| 21 | −2294.463 | 3.56 | 1.59522 | 67.7 |
| 22 | −63.002 | 0.23 | | |
| 23 | 89.422 | 7.14 | 1.59522 | 67.7 |
| 24 | −34.732 | 0.30 | | |
| 25* | −141.120 | 4.33 | 1.85400 | 40.4 |
| 26 | −44.005 | | | |

Aspherical surface data

Second surface

K = 0.00000e+000  A4 = −6.70614e−007  A6 = −3.58847e−009
A8 = 6.59574e−012  A10 = −1.46451e−014  A12 = 8.71825e−018

Twenty-fifth surface

K = 0.00000e+000  A4 = −6.60341e−006  A6 = −7.41900e−010
A8 = −4.55318e−012  A10 = 2.18534e−015  A12 = −1.01563e−018

| | |
|---|---|
| Focal length | 35.22 |
| F number | 1.45 |
| Half field angle (degree) | 31.56 |
| Image height | 21.64 |
| Total lens length | 141.00 |
| BF | 39.00 |

Each unit data

| | |
|---|---|
| f1 | 177.76 |
| f2 | 55.81 |

-continued

Unit mm

| | |
|---|---|
| PL | 15.69 |
| D1 | 50.43 |
| ok1 | 94.29 |

NUMERICAL EXAMPLE 4

Unit mm

Surface data

| Surface number | r | d | nd | vd |
|---|---|---|---|---|
| 1 | 84.113 | 3.67 | 1.58313 | 59.4 |
| 2* | 27.189 | 12.00 | | |
| 3 | −142.418 | 1.93 | 1.48749 | 70.2 |
| 4 | 56.221 | 3.57 | | |
| 5 | 306.637 | 4.38 | 1.91082 | 35.3 |
| 6 | −107.662 | 4.63 | | |
| 7 | −42.576 | 1.84 | 1.58144 | 40.8 |
| 8 | 153.188 | 0.15 | | |
| 9 | 68.596 | 8.13 | 1.88300 | 40.8 |
| 10 | −78.813 | 0.20 | | |
| 11 | 116.533 | 8.32 | 1.49700 | 81.5 |
| 12 | −39.443 | 1.20 | 1.73800 | 32.3 |
| 13 | −99.315 | 7.29 | | |
| 14 | 43.208 | 5.78 | 1.91082 | 35.3 |
| 15 | 1115.555 | 1.24 | | |
| 16 | 223.896 | 4.01 | 1.61800 | 63.3 |
| 17 | −128.145 | 1.56 | 1.73800 | 32.3 |
| 18 | 29.822 | 5.81 | | |
| 19 (Stop) | ∞ | 6.96 | | |
| 20 | −21.015 | 4.04 | 1.49700 | 81.5 |
| 21 | −16.448 | 1.50 | 1.69895 | 30.1 |
| 22 | −54.637 | 0.15 | | |
| 23 | 98.619 | 7.64 | 1.59522 | 67.7 |
| 24 | −31.682 | 0.15 | | |
| 25* | −105.584 | 4.34 | 1.85400 | 40.4 |
| 26 | −39.728 | | | |

Aspherical surface data

Second surface

| | | |
|---|---|---|
| K = 0.00000e+000 | A4 = −1.57357e−006 | A6 = −2.21246e−009 |
| A8 = −5.09498e−012 | A10 = 1.13515e−014 | A12 = −1.88410e−017 |

Twenty-fifth surface

| | | |
|---|---|---|
| K = 0.00000e+000 | A4 = −7.47181e−006 | A6 = −9.29399e−010 |
| A8 = −6.94083e−012 | A10 = 4.32235e−015 | A12 = −3.97435e−018 |

| | |
|---|---|
| Focal length | 34.30 |
| F number | 1.45 |
| Half field angle (degree) | 32.24 |
| Image height | 21.64 |
| Total lens length | 139.48 |
| BF | 39.00 |

Each unit data

| | |
|---|---|
| f1 | 157.95 |
| f2 | 53.03 |
| PL | 17.85 |
| D1 | 50.02 |
| ok1 | 79.28 |

TABLE 1

| Conditional Expression | | Example 1 | Example 2 | Example 3 | Example 4 |
|---|---|---|---|---|---|
| (1) | PL/D1 | 0.25 | 0.29 | 0.31 | 0.36 |
| (2) | ok1/D1 | 1.72 | 1.45 | 1.87 | 1.58 |
| (3) | f1/f2 | 2.81 | 2.66 | 3.19 | 2.98 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-208127, filed Oct. 3, 2013, which is hereby incorporated by reference herein in its entirety.

What is claimed is:

1. An optical system, comprising, in order from an object side to an image side:
   a first lens unit having a positive refractive power; and
   a second lens unit having a positive refractive power,
   the second lens unit comprising, in order from the object side to the image side, a front unit, an aperture stop, and a rear unit having a positive refractive power,
   the first lens unit comprising a negative lens that has a convex surface facing the object side and is arranged closest to the object side, and three or more positive lenses on the image side of the negative lens,
   wherein the front unit and the rear unit are configured to move during focusing, and
   wherein the following conditional expression is satisfied:

$$0.15 < PL/D1 < 0.50$$

where PL denotes a distance, on an optical axis, from a lens surface on the object side of a second positive lens counted from the image side among the three or more positive lenses comprised in the first lens unit to a lens surface closest to the image side of the first lens unit, and D1 denotes a distance, on the optical axis, from a lens surface closest to the object side of the first lens unit to a lens surface closest to the image side of the first lens unit.

2. An optical system according to claim 1, wherein a rear principal point of the first lens unit is arranged on the image side with respect to the lens surface closest to the image side of the first lens unit.

3. An optical system according to claim 1, wherein the following conditional expression is satisfied:

$$1.0 < ok1/D1 < 3.0$$

where ok1 denotes a distance from the lens surface closest to the image side of the first lens unit to the rear principal point of the first lens unit.

4. An optical system according to claim 1, wherein the first lens unit comprises three or more negative lenses.

5. An optical system according to claim 1, further comprising three or more negative lenses arranged on the object side with respect to the second positive lens counted from the image side among the three or more positive lenses comprised in the first lens unit.

6. An optical system according to claim 1, wherein a height, from the optical axis, of a marginal ray of an on-axial beam is highest in the lens comprised in the first lens unit of the entire optical system.

7. An optical system according to claim 1, wherein the second lens unit moves to the object side on the optical axis during focusing from infinity to a short distance.

8. An optical system according to claim 1, wherein the following conditional expression is satisfied:

$$1.5 < f1/f2 < 5.0$$

where f1 denotes a focal length of the first lens unit, and f2 denotes a focal length of the second lens unit.

9. An optical system according to claim 1, wherein the first lens unit includes, in order from the object side to the image side, a negative lens having a convex surface facing the object side, a negative lens, a positive lens, a negative lens, a positive lens, and one or more positive lenses.

10. An optical system according to claim 1, wherein at least one of a first positive lens or the second positive lens counted from the image side of the first lens unit is cemented to a negative lens to construct a cemented lens.

11. An optical system according to claim 10, wherein a cemented surface of the cemented lens has a concave surface facing the object side.

12. An image pickup apparatus, comprising:
an optical system; and
an image sensor configured to receive an image formed by the optical system,
wherein the optical system comprises, in order from an object side to an image side:
a first lens unit having a positive refractive power; and
a second lens unit having a positive refractive power,
the second lens unit comprising, in order from the object side to the image side, a front unit, an aperture stop, and a rear unit having a positive refractive power,
the first lens unit comprising a negative lens that has a convex surface facing the object side and is arranged closest to the object side, and three or more positive lenses on the image side of the negative lens,
wherein the front unit and the rear unit are configured to move during focusing, and
wherein the following conditional expression is satisfied:

$$0.15 < PL/D1 < 0.50$$

where PL denotes a distance, on an optical axis, from a lens surface on the object side of a second positive lens counted from the image side among the three or more positive lenses comprised in the first lens unit to a lens surface closest to the image side of the first lens unit, and D1 denotes a distance, on the optical axis, from a lens surface closest to the object side of the first lens unit to a lens surface closest to the image side of the first lens unit.

13. An image pickup apparatus according to claim 12, wherein two or more positive lenses comprised in the first lens unit are arranged in a region in which a height, from the optical axis, of a principal ray of a light flux which reaches a maximum image height of an imaging plane of an image pickup element is lower than a height from the optical axis of a marginal ray of an on-axial beam.

* * * * *